(12) United States Patent
Anderegg

(10) Patent No.: US 11,615,575 B2
(45) Date of Patent: Mar. 28, 2023

(54) METHODS AND SYSTEMS FOR CONSTRUCTING A SHADER

(71) Applicant: Verizon Patent and Licensing Inc., Basking Ridge, NJ (US)

(72) Inventor: Bradley G. Anderegg, Glen Gardner, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/351,898

(22) Filed: Jun. 18, 2021

(65) Prior Publication Data
US 2021/0312693 A1 Oct. 7, 2021

Related U.S. Application Data

(63) Continuation of application No. 16/805,462, filed on Feb. 28, 2020, now Pat. No. 11,069,119.

(51) Int. Cl.
*G06T 15/00* (2011.01)
*G06T 15/80* (2011.01)
*G06T 1/20* (2006.01)

(52) U.S. Cl.
CPC ............ *G06T 15/005* (2013.01); *G06T 15/80* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 7,548,238 B2 | 6/2009 | Berteig et al. | |
| 7,750,913 B1* | 7/2010 | Parenteau | G06F 8/30 345/426 |
| 8,203,558 B2 | 6/2012 | Abbas | |
| 8,743,116 B1* | 6/2014 | Horowitz | G06T 15/005 345/589 |
| 9,824,484 B2 | 11/2017 | Oneppo et al. | |
| 11,069,119 B1* | 7/2021 | Anderegg | G06T 15/005 |
| 2007/0018980 A1* | 1/2007 | Berteig | G06T 15/80 345/426 |
| 2012/0236000 A1 | 9/2012 | Abbas | |
| 2014/0354658 A1* | 12/2014 | Dotsenko | G06T 1/20 345/522 |
| 2018/0246655 A1 | 8/2018 | Schmit et al. | |
| 2018/0350028 A1 | 12/2018 | Chiu et al. | |
| 2022/0051476 A1* | 2/2022 | Woop | G06F 9/5016 |
| 2022/0189112 A1* | 6/2022 | Pathak | G06T 15/005 |

* cited by examiner

*Primary Examiner* — Ryan M Gray

(57) ABSTRACT

An illustrative shader construction system accesses a plurality of instructions based on a shader construction request. The plurality of instructions is associated with a shader component indicated in the shader construction request and includes a first instruction that relates to a selected platform indicated in the shader construction request and a second instruction that relates to a non-selected platform and that is incompatible with the selected platform. The shader construction system assembles a shader based on the plurality of instructions. The assembled shader is configured for use with the selected platform to perform a shader function implemented by the shader component. The shader construction system provides the assembled shader to a graphics rendering system configured to use the assembled shader to perform the shader function as part of rendering an image. Corresponding methods and systems are also disclosed.

20 Claims, 8 Drawing Sheets

METHODS AND SYSTEMS FOR CONSTRUCTING A SHADER

RELATED APPLICATIONS

This application is a continuation application of U.S. patent application Ser. No. 16/805,462, filed Feb. 28, 2020, and entitled "Methods and Systems for Constructing a Shader," which is hereby incorporated by reference in its entirety.

BACKGROUND INFORMATION

In a variety of applications, computer graphics are rendered to present a scene (e.g., a two-dimensional ("2D") or three-dimensional ("3D") scene that includes various 2D or 3D objects, etc.) to a user. For example, computer graphics may be associated with video gaming applications, extended reality applications (e.g., virtual reality applications, augmented reality applications, etc.), movie animation, and/or any of various other types of applications in which simulated 2D or 3D worlds are presented to users.

Shaders are employed in computer graphics to perform shading of objects and other imagery in a scene (e.g., to properly produce light, darkness, color, etc., for the scene), as well as, in certain examples, to perform a variety of other specialized functions (e.g., functions that may or may not be associated with shading or computer graphics) due to the convenience and power provided by shader-based computing.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
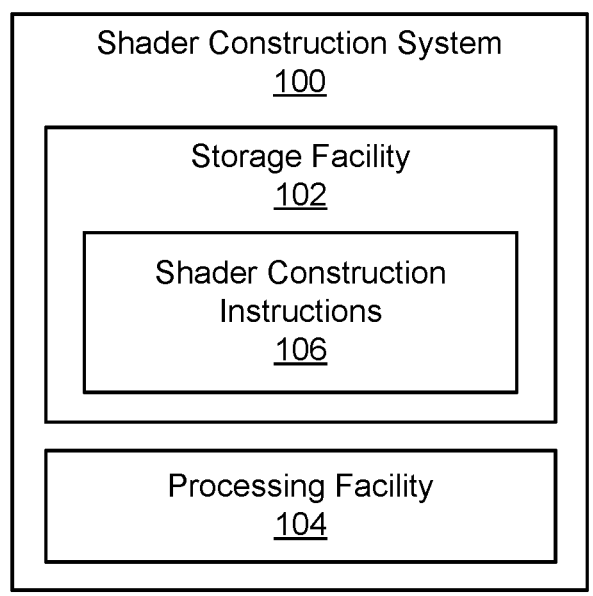
FIG. 1 illustrates an exemplary shader construction system for constructing a shader from a set of selected shader components according to embodiments described herein.

Methods and systems for constructing a shader are described herein. As mentioned above, shaders provide a powerful and convenient way for computers to shade computer graphics and/or to otherwise process whatever data may be of interest in a particular application. In particular, shaders provide software developers with an important way (and in some cases an only way) of accessing the power of graphical processing units ("GPUs") and/or other such hardware resources for computer graphics rendering and/or other computing applications. For example, vertex shaders provide powerful and flexible control of vertex coordinates for various triangles or other polygons used for graphics rendering, fragment shaders provide powerful and flexible control of how individual fragments (e.g., pixels) are shaded in terms of color, lightness, darkness, and so forth. Without shaders, software would generally be limited to executing on the central processing unit ("CPU") of a computer, rather than on a GPU, and operations such as the vertex and segment shading operations described above would be limited to preconfigured operations provided by GPU driver software or other such graphics driver software. With shaders, however, developers may gain a greater degree of control of GPU and other graphics resources such that customized functionality may be developed and deployed.

Methods and systems described herein for constructing a shader from a set of selected shader components facilitate the automatic construction of shaders as needed for particular applications based on modular sets of computer instructions referred to herein as shader components. As will be described herein, shader components implement individual aspects of shader functionality from which full shaders can be assembled for use in graphics rendering and other such applications. For instance, in one exemplary implementation, a shader construction system may receive a shader construction request that may serve essentially as a compressed representation of the shader by indicating a set of selected shader components, a platform indicator, and any other parameters needed for the shader construction system to automatically construct the shader. The set of shader components may be selected, for example, from a library of available shader components accessible to the shader construction system, and may include, possibly among other shader components, a first shader component configured to perform a first shader function and a second shader component configured to perform a second shader function (e.g., a shader function distinct from the first shader function). The platform indicator may be indicative of a selected platform for which a shader is to be constructed. For example, the selected platform may be a certain one of a plurality of platforms (e.g., graphics application programming interfaces ("graphics APIs"), operating systems, particular major and/or minor versions of the platforms, etc.) that are supported by the shader construction system.

Based on the shader construction request, the shader construction system may access instructions associated with the first and second shader components. For example, program code or other instructions may be included within the request, accessed from a storage facility based on a pointer or link included within the request, or otherwise accessed in any manner as may serve a particular implementation. Based on the instructions associated with the first and second shader components, the shader construction system may assemble a shader that implements the first and second shader functions. In some examples, this shader may be assembled in such a manner as to configure the shader for use with the selected platform by a graphics rendering system. For example, the graphics rendering system may be associated with the selected platform and may use the assembled shader (as well as other shaders in certain examples) to render one or more images (e.g., an image stream) that depict an accurate representation of a virtual or real-world scene that includes various virtual and/or real-world objects rendered and shaded in a sophisticated, realistic, and immersive manner.

Shader construction systems and methods described herein for constructing shaders based on sets of selected shader components may provide various benefits and advantages. For example, shaders constructed in accordance with methods and systems described herein may be constructed on an as-needed basis and thereby avoid a combinatorial explosion of configurations that may otherwise be required when new shader functionality is to be added to shaders used for a particular application. As a result of flexibility provided by the shader construction systems and methods described herein, significant resource inefficiency may be avoided as data storage and other finite resources may be conserved.

The shader construction methods and systems described herein also allow specific shaders to be requested that have not yet been developed (e.g., programmed, compiled, loaded, etc.) using descriptive shader signatures that will be described. Requested shaders described in this way may be automatically and efficiently assembled, compiled, optimized, and deployed. Additionally, in certain examples, as will be described in more detail below, multi-access servers (e.g., multi-access edge compute servers ("MEC servers") operating on provider networks, cloud servers operating on the Internet, etc.) may also be employed to allow shaders to be constructed and maintained on-demand and/or in real time while graphics are being rendered in a real-time application.

Various embodiments will now be described in more detail with reference to the figures. The disclosed methods and devices may provide one or more of the benefits mentioned above and/or various additional and/or alternative benefits that will be made apparent herein.

FIG. 1 illustrates an exemplary shader construction system 100 ("system 100") for constructing a shader from a set of selected shader components. System 100 may be implemented on (i.e., implemented by the resources of) a development computer, a multi-access server (e.g., a MEC server, a cloud server, etc.), or any other suitable computing system. In certain configurations, as will be described in more below, the computing system on which system 100 is implemented may also implement or be communicatively coupled with other computing systems such as a graphics rendering system (e.g., a system that renders computer graphics using the automatically constructed shaders), a graphics presentation system (e.g., a media player device that presents rendered graphics to a user), or the like.

As shown, system 100 may include, without limitation, a storage facility 102 and a processing facility 104 selectively and communicatively coupled to one another. Facilities 102 and 104 may each include or be implemented by hardware and/or software components of a suitable computing system (e.g., processors, memories, communication interfaces, instructions stored in memory for execution by the processors, etc.). In some examples, facilities 102 and 104 may be distributed between multiple devices and/or multiple locations as may serve a particular implementation.

The methods described herein for constructing a shader from a set of selected shader components may be performed, implemented, or used by implementations of system 100 configured for use in a variety of different types of use cases. To provide just a few non-limiting examples, implementations of system 100 may be deployed to serve extended reality applications (e.g., augmented or virtual reality applications, etc.), gaming applications (e.g., 3D games in which users perform tasks alone or by interacting with other users playing the game simultaneously), movie or entertainment applications (e.g., computer-generated animation or special effects applications, etc.), or any other applications in which it is desirable to render high-quality graphics in a flexible and customizable way. Each of facilities 102 and 104 within system 100 will now be described in more detail.

Storage facility 102 may store and/or otherwise maintain executable data used by processing facility 104 to perform any of the functionality described herein. For example, storage facility 102 may store shader construction instructions 106 that may be executed by processing facility 104. Shader construction instructions 106 may be executed by processing facility 104 to perform any of the functionality described herein, but will be understood, at least in certain examples, to be distinct from instructions referred to herein as being associated with particular shader components. Shader construction instructions 106 may be implemented by any suitable application, software, code, and/or other executable data instance. Additionally, storage facility 102 may also maintain any other data accessed, managed, used, and/or transmitted by processing facility 104 in a particular implementation. For example, together with shader construction instructions 106, storage facility 102 may further store instructions associated with various shader components, as will be described in more detail below.

Processing facility 104 may be configured to perform (e.g., execute shader construction instructions 106 stored in storage facility 102 to perform) various functions associated with constructing a shader from a set of selected shader components in any of the ways described herein. For example, processing facility 104 may be configured to receive a shader construction request, to access particular instructions based on the shader construction request, and to assemble a shader based on the accessed instructions.

The shader construction request received by processing facility 104 may be parsed to identify one or more different pieces of information included in the shader construction request. For example, processing facility 104 may parse the shader construction request (e.g., in response to receiving the shader construction request) to identify a set of selected shader components and a platform indicator. As will be described in more detail below, the shader construction request may, in certain implementations, include a shader signature that describes a requested shader that does not yet exist in a predefined or standardized way to allow system 100 to properly and automatically construct the shader as requested.

Each of the shader components in the set of selected shader components may be selected from a library of available shader components that is accessible to system 100. For example, any of various types of default libraries (e.g., built-in or system-defined libraries that are provided for the user rather than being defined by the user) may be loaded at startup from any suitable data sources such as from local storage on a server implementing system 100, from a database connected to the server implementing system 100, from a cloud server communicatively coupled with the server implementing system 100, from an S3 bucket generated by a web-based editor, from a docker image or shader generator executable acting as a shader server on a MEC server implementing or communicatively coupled to system 100, or from another suitable source indicated by the user. In some examples, certain selected shader components may also be customized components developed or modified by a user and included within a user-defined shader component library rather than a default shader component library such as described above. For instance, a user may supply a library of shader components or a list of shader component libraries that are stored and loaded in any of the same ways described above in relation to default shader component libraries or in other suitable ways (e.g., using a plugin system to dynamically load libraries whereby new shader signatures would become available to the user). Among the set of selected shader components, a first shader component and a second shader component may be included in particular. The first shader component may be configured to perform a first shader function, while the second shader component may be configured to perform a second shader function distinct from the first shader function.

The shader construction request may further include a platform indicator. As will be described in more detail below, different shaders may be associated with and optimized for different platforms (e.g., different graphics APIs, different operating systems, different development environments, etc.). Accordingly, the platform indicator included in the shader construction request may be indicative of a selected platform for which a shader is to be constructed by system 100. For instance, this platform may be selected from a plurality of platforms supported by system 100.

Shader construction request data representing the set of selected shader components and the platform indicator may be implemented as any type of identifier data usable to access, or serving to facilitate the accessing of, data from an asset data source in any suitable way. For example, the set of selected shader components and/or the platform indicator may each take the form of a file path, a link, or another pointer to a location within storage facility 102 or another data store of system 100, or of a multi-access server or other data store communicatively coupled with system 100, or of any other location where code or platform data may be stored. In some examples, some or all of the shader component and platform data indicated by the shader construction request may be embedded directly into the shader construction request itself instead of or in addition to including the pointer-based indicators. Various other information (e.g., metadata for the shader components, other shader components besides the first and second shader components, parameters defining particular variations of shader components that are to be used in constructing the assembled shader, etc.) may also be included in and parsed from the shader construction request as may serve a particular implementation.

Based on the shader construction request, processing facility 104 may access instructions associated with the first and second shader components. For example, processing facility 104 may access the instructions from storage facility 102 if the shader construction request includes a link to instructions within storage facility 102. In other examples, the shader construction request may include a link, uniform resource locator ("URL"), or other pointer to a different system or database separate from and communicatively coupled with system 100, and processing facility 104 may access the instructions from the separate system or database. As mentioned above, in still other examples, the shader construction request may include the instructions embedded into the request itself, or may otherwise provide information that allows processing facility 104 to gain access to the instructions associated with the shader components in the set of selected shader components.

Based on the accessed instructions associated with the first and second shader components, processing facility 104 may assemble a shader that implements the first and second shader functions. This shader may be referred to herein as the "assembled shader" after being assembled in this way, or as a "constructed shader" since the shader is automatically constructed by methods and systems described herein. The shader is assembled so as to be configured for use with the selected platform by a graphics rendering system to render an image. For example, processing facility 104 may further be configured to provide, subsequent to the assembling of the shader that implements the first and second shader functions, the assembled shader to a graphics rendering system for use in rendering the image. As such, the assembling of the shader may be performed such that the assembled shader will be usable by the graphics rendering system for rendering images (e.g., individual images, a series of images in an image sequence such as a video, etc.). This may be the case for any particular platform that the graphics rendering system may be associated with, based on the selected platform included in the shader construction request.

Processing facility 104 may provide the assembled shader to the graphics rendering system in any suitable form or format as may serve a particular implementation. For example, the assembled shader may be provided in a human-readable form (e.g., source code for the shader, etc.), an executable (or otherwise compiled and linked) form that is only readable by a computer, or any other form as may serve a particular implementation. In some examples, the graphics rendering system may be integrated into system 100, such as by being implemented by processing facility 104. In these examples, the providing of the assembled shader to the graphics rendering system may not be necessary, or may be considered to have been performed as soon as the assembled shader has been constructed and is ready for use by processing facility 104 (e.g., by a graphics rendering system implemented by processing facility 104) for rendering an image.

In various applications and use cases, system 100 may be configured to operate in real time so as to provide, receive, process, and/or use the data described above (e.g., shader construction requests, shader components, assembled shaders, etc.) immediately as the data is generated, updated, changed, exchanged, or otherwise becomes available. As a result, in certain examples, system 100 may be configured to construct shaders from respective sets of selected shader components based on relevant, real-time data so as to allow graphics rendering to happen responsively to user decisions that would affect the user's viewpoint of a 3D scene, that would affect objects within the scene, and so forth. As used herein, operations may be performed in "real time" when they are performed immediately and without undue delay. In some examples, real-time data processing operations may be performed in relation to data that is highly dynamic and time sensitive (i.e., data that becomes irrelevant after a very short time). As such, real-time operations may construct shaders from sets of selected shader components based on data that is relevant and up-to-date.

Figure 2:
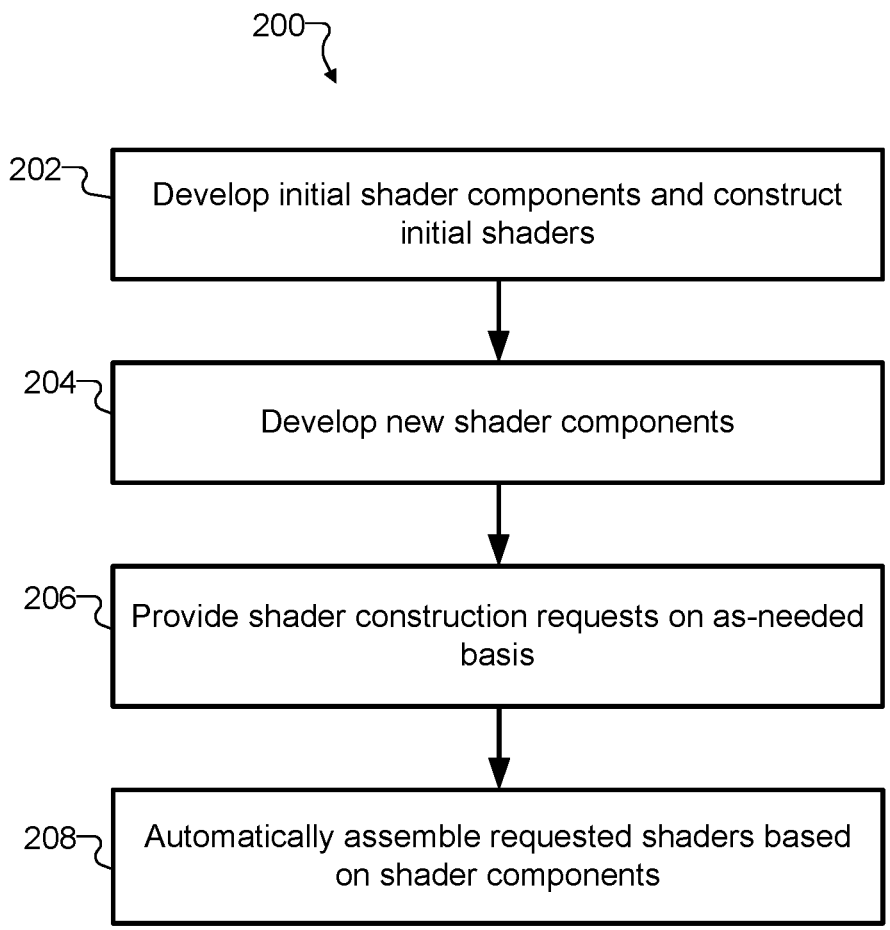
FIG. 2 illustrates an exemplary workflow for developing and deploying a shader according to embodiments described herein.

FIG. 2 illustrates an exemplary workflow 200 for developing and deploying shaders in accordance with shader construction systems and methods described herein (e.g., system 100, described above). At step 202 in workflow 200, certain initial shader components are developed to perform certain desired shader functions. As mentioned above, shader components described herein may be implemented as modular sets of computer instructions, each of which may perform one individual shader function (or, in certain examples, a combination of related shader functions that are desirable to perform together). Each shader component is modular in the sense that it may be programmed, tested, and otherwise configured for use, along with other shader components, in automatically generated shaders that are assembled, compiled, and configured for use without code integration (e.g., copying and pasting, etc.), recompiling, debugging, testing, or other such tasks needing to be performed by a developer.

Figure 3:
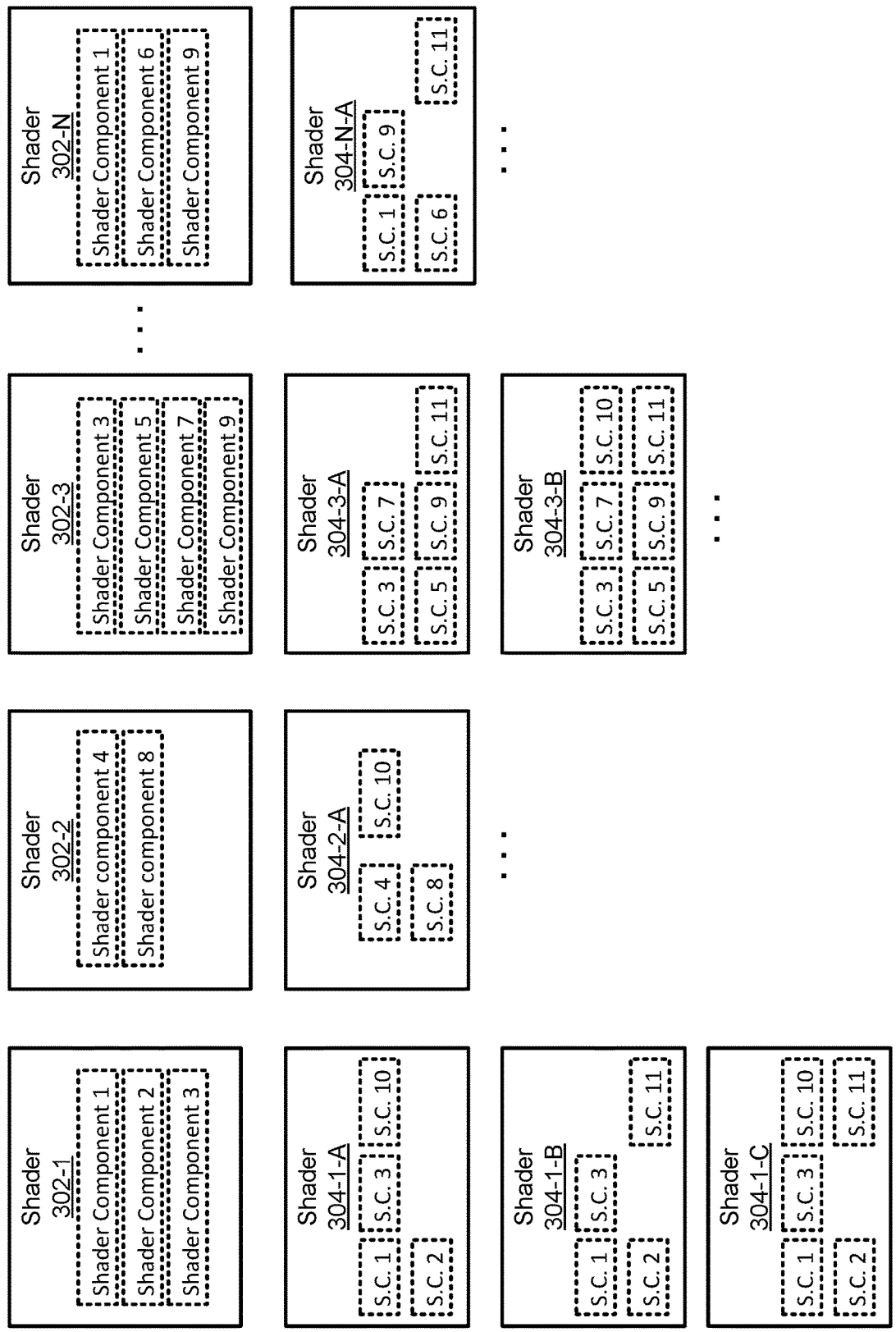
FIG. 3 illustrates various exemplary shaders that may be developed and deployed using the workflow of FIG. 2 according to principles described herein.

Additionally at step 202, the shader components that have been developed may be used to construct a set of initial shaders. To illustrate, FIG. 3 shows, along the top row, various exemplary shaders 302 (e.g., shaders 302-1 through 302-N) that may be initially developed and deployed at step 202 of workflow 200. As shown, rather than including hard-coded shader functions, each shader 302 is constructed from one or more shader components labeled as shader components 1-9. For example, shader 302-1 is constructed using shader components 1, 2, and 3; shader 302-2 is constructed using shader components 4 and 8; shader 302-3 is constructed using shader components 3 (i.e., the same shader component used for shader 302-1) as well as shader components 5, 7, and 9; and shader 302-N is constructed using shader components 1 and 9 (the same shader components as shaders 302-1 and 302-3, respectively) as well as a shader component 6. It will be understood that fewer shaders may be developed in certain examples, and that more shaders (e.g., including any suitable number of shaders between shader 302-3 and 302-N) may be developed in other examples.

Various potential shader functions will be described in more detail below, but, to provide a non-limiting example of the types of shader functions that may be performed by the shader components of which shaders 302 are constructed, it will be assumed for purposes of this example that shader component 1 controls how pixels on an object are colored and shaded to simulate a first directional light disposed at a particular place in a scene, shader component 2 controls how pixels on the object are colored and shaded to simulate a second directional light disposed at a different particular place in the scene, and shader component 3 controls how pixels on the object are colored and shaded to stimulate a spot light disposed at yet another particular location in the scene. Accordingly, shader 302-1 may be configured to shade pixels with respect to these three lights for objects in the scene. Other shader components 4-9 used by other shaders 302-2 through 302-N may be implemented to perform any other suitable shader functions described herein and may similarly be used to accurately handle various shading and non-shading functions or tasks as objects in the scene are rendered.

Returning to FIG. 2, step 202 is followed by step 204 in workflow 200. At step 204, new shader components are developed to add shader functionality that may not have been anticipated or needed at the development of initial shader components 1-9 at step 202. For example, step 202 may be associated with a first version of an application that is later updated, supplemented, or added to (e.g., an updated version of an extended reality world, a new level or a sequel of a video game, etc.) at step 204. In the ongoing example being described, for instance, it will be assumed that after the initial shaders 302 have been developed, new shader functionality has been determined to be needed for shading a particular scene in a particular application. Accordingly, new shader components are developed to implement the shader functionality.

As with the shader functions described above, it will be understood that the new shader functions could be any of the shader functions described herein. However, for purposes of illustration, it will be assumed that one new shader function that is to be added is a fog effect shader function (e.g., a function that controls how pixel color is to be affected due to fog in the scene), and the other new shader function that is to be added is a color correction shader function (e.g., a function that adjusts pixel color values to account for color aspects such as gamma correction, exposure, static tone mapping, or the like). For the ongoing example, the shader components developed to implement these new shader functions will be referred to as shader component 10 (i.e., the fog effect shader component) and shader component 11 (i.e., the color correction shader component).

At step 206 of workflow 200, shader construction requests may be provided on an as-needed basis that may use initial shaders 302 constructed at step 202 or that may call for new shaders that are to be constructed from the initial shader components developed at step 202 and/or new shader components developed at step 204. Then, at step 208 of workflow 200, system 100 automatically assembles requested shaders using appropriate shader components that have been requested. For instance, in certain implementations, system 100 may assemble and provide human-readable shader source code that is ready to be manually compiled (or further edited by a developer if desired) and used. In other implementations, system 100 may, after assembling the shader code, further perform an automatic compiling procedure (e.g., compiling for a particular graphics platform, for a particular language, for a particular operating system or development environment, etc.) so as to provide a compiled shader that is ready for use.

When a compiled shader is provided in this way, it may be beneficial and convenient to the user and may also serve to facilitate digital rights management for the source code of the shader components integrated into the compiled shader, since the source code in this case is not exposed to the user requesting the shader or to other people. Another advantage of keeping source code from being provided to users may be that certain shader content (e.g., content that is not licensed for use where the source code could be accessed by users) may be leveraged and used that otherwise would not be usable under the terms of a license governing the content.

Additionally, as will be described in more detail below, the shader code assembled by system 100 at step 208 may be processed in various other ways to optimize the code for certain platforms and/or to otherwise optimize or improve the efficiency of the shaders that are provided in response to the shader construction requests.

To illustrate requested shaders that are automatically constructed in accordance with these principles, FIG. 3 shows various shaders 304 that are assembled from shader components 1-11 (notated, respectively, as "S.C. 1" through "S.C. 11" in FIG. 3) as requested on an as-needed basis. As illustrated by the arrangement of shaders 302 and 304 into columns 1-N in FIG. 3, various new shaders 304 may be related to similarly numbered initial shaders 302 described above. For example, as shown, all the shaders in the first column (i.e., shader 302-1 and shaders 304-1-A, 304-1-B, and 304-1-C) are shown to be constructed using the same three initial shader components 1, 2, and 3. However, the new shaders 304 are also shown to include different combinations of the new shader components 10 and 11 that may have been requested (i.e., shader 304-1-A is shown to add shader component 10 only, shader 304-1-B is shown to add shader component 11 only, and shader 304-1-C is shown to add both shader components 10 and 11).

Similar new shaders 304 are shown to be included in the second through the Nth column of FIG. 3, each of these shaders 304 combining the initial shader components of the respective shaders 302 with requested combinations of new shader components 10 and 11. However, whereas each possible combination of new shader components is shown to have been requested and constructed for a respective new shader 304-1 in the first column, it is noted that only a subset of possible new shaders 304 has been requested and constructed in each of the other columns. For example, in the second column, only a new shader 304-2-A with shader components 4, 8, and 10 has been requested, and there has not yet been a need for new shaders 304-2 that include, for example, shader components 4, 8, and 11, or shader components 4, 8, 10, and 11. Because shaders 304 are automatically assembled at step 208 based on shader construction requests provided at step 206 on an as-needed basis, new shaders 304 having these possible, but not yet requested, combinations of shader components have not yet been constructed and thus are not making inefficient use of any system resources (e.g., storage resources, processing resources for compiling, developer time, etc.).

While FIG. 3 specifically illustrates how new shader components may be automatically and efficiently added onto existing shaders (e.g., initial shaders 302) on an as-needed basis, it will be understood that the shader-component-based architecture described herein may allow for various other possible shaders to be automatically and efficiently constructed from any desirable combination of shader components. Some such shaders would not fit into any column shown in FIG. 3 because they would not be based on particular initial shaders 302 that happen to have already been created. For example, a new shader 304 may be constructed that only implements the shader functions of shader components 10 and 11, a new shader 304 may be constructed that implements all the shader functions of shader components 1-11, or any other suitable combination as may be requested. At the same time, significant efficiency arises from the fact that only requested shaders having requested combinations of shader components are constructed, compiled, stored, or otherwise allocated system resources. A large number of possible combinations of shader components that may not be needed to render graphics for a particular application thus are not generated, stored, compiled, tested, or the like, and inefficient use of system resources to perform such tasks is avoided.

Shaders 302 and 304, as well as the shader components from which these shaders are constructed, may be configured to calculate rendering effects on graphics hardware with a high degree of flexibility. For instance, certain shaders 302 and/or 304 and their corresponding shader components may be configured to execute on a GPU to program the GPU's rendering pipeline (as opposed to operating with a fixed-function pipeline that only allows for common geometry transforming and pixel-shading functions). To this end, each shader component used in one of shaders 302 or 304 may implement any suitable shader function as may serve a particular implementation. For example, along with various shader function examples that have been mentioned or described above (e.g., fog effects, color correction, etc.), various other shader functions may also be implemented by shader components to modify position and/or color (e.g., hue, saturation, brightness, contrast, etc.) of any pixels, vertices, and/or textures of an object in a manner that allows for a final rendered image to be constructed and/or altered using algorithms defined in the shader 302 or 304 (or corresponding shading shader component included therein).

Exemplary shader components may be configured for use in cinema post-processing, computer-generated imagery, video games, extended reality, or other such applications to produce a range of effects. For example, shader components may relate to different color spaces, to shading for different types of light sources (e.g., directional light sources, spot light sources, point light sources, etc.), to physically-based rendering functions, to subsurface scattering functions, to rendering functions for certain common objects associated with particular shading considerations (e.g., human hair, clothing, animal fur, etc.), to animations or other vertex matrix changes for vertex shader components, or to other suitable effects such as blur effects, light bloom effects, volumetric lighting effects, depth effects, distortion effects, psychedelic effects, and so forth.

In some examples, a library of available shader components may be made accessible to a shader construction system such as system 100 so that a set of selected shader components selected from the library may be indicated in a shader construction request and instructions associated with the library may be used to assemble and construct the requested shaders.

For example, one exemplary shader component library may include, without limitation, shader components that implement any of the following shader functions:

1. A mesh shader function
2. A material shader function
3. A texture coordinate shader function
4. An animation shader function
5. A particle position shader function
6. A compute lighting shader function for per-pixel lighting with dynamic lights specified for a material
7. A point light shader function to support dynamic per-pixel point lights
8. A spotlight shader function to support dynamic per-pixel spotlights
9. A directional light shader function to support dynamic per-pixel directional lights
10. A font atlas alpha function for supporting an alphabet atlas
11. A fontSDF function for text rendering using a signed distance field technique
12. A transition effect function for film-like transitions with different types of patterns (e.g., fade in, fade out, fade to black or to another specific color/texture, etc.)
13. A Gaussian blur function to apply a one axis at a time Gaussian blur with controls for radius, curve, direction, etc.
14. A bright pass function to eliminate everything below a certain brightness threshold (e.g., used for high dynamic range ("HDR") images, etc.)
15. A glow pass function similar to the bright pass function that reads an emissive material parameter rather than using the brightness threshold (e.g., used for non-HDR images, etc.)
16. A compose function that blends together multiple input images and takes sourceMultiplier parameters to determine how to weight each input in the final output with respect to the other inputs
17. A YUV conversion function to convert color values from the RGB (red-green-blue) color space to the YUV (luma-blue-red) color space
18. A distortion effect function to create full screen alpha blending effects (e.g., full screen refraction effects, etc.)
19. A physically-based rendering function that takes roughness and metal parameters and supports irradiance/radiance shading using environment map (e.g., cubemap, octahedral map etc.) projections 20. A luminance function used to convert a frame to luminance values
21. An adapted luminance function used to normalize an input frame according to a weighted average luminance
22. A tone mapper function used to perform HDR tonemapping
23. A fog effect function that provides linear and exponential fog
24. A projected texture function
25. A shadow map function
26. A color correction function to support color functions such as gamma correction, exposure, static tone mapping, etc.
27. A convolution function that operates on an environment map to generate irradiance from a panoramic image
28. An image-based lighting material function used for applying an irradiance map to a material and also supporting directional occlusion with a pre-generated directional occlusion map
29. An importance sample that operates on an environment map to generate a radiance mip map chain for physically-based rendering materials
30. A hair shader function for real-time hair shading
31. A hair from look-up-table shader function for reduced processing hair shading that utilizes a look-up-table for a full range of input data angles rather than performing full, real-time hair shading
32. A hair environment map shader function for shading hair via image instead of via light direction
33. A subsurface material shader function used to generate subsurface lighting effects to give materials a softer glow
34. An object space unwrap shader function for unwrapping a model into texture space
35. An eyeball shader function
36. A car paint shader function It will be understood that these shader functions are exemplary shader functions that could be implemented by the shader components of one exemplary library, and that other libraries may include more or fewer shader components, different shader components associated with other shader functions, or the like as may serve a particular implementation. It will also be understood that, while shaders 302 and 304 in FIG. 3 show combinations of shader components in each shader, many or all of the shader functions listed above (as well as other shader functions described herein) may be requested alone and, as such, may be implemented in their own shader without other shader components. For example, a gaussian blur or tonemapping shader function may be requested as a standalone shader function, so a respective shader that includes only such functionality may be constructed to meet this request. In other examples, it may be desirable for the blurring or tonemapping functionality to be performed after a string of other shader functions have been performed, in which case these shader components may be included at the end of a set of selected shader components in a shader construction request.

While default libraries of shader components such as the exemplary library described above may be useful and convenient for allowing shader construction requests of common or established shader functionality, it may also be the case, in certain examples, that more customized shader functionality is desired. As such, the set of selected shader components received in a particular shader construction request may include (e.g., together with the shader components from the default library of available shader components accessible to the shader construction system) at least one user-defined shader component that is developed independently of the shader components from the default library of available shader components. For instance, in the example of FIG. 3, shader components 1-9 could represent shader components selected from a default library of pre-configured shader components such as a default library loaded at startup from local storage, a database, a cloud server, a MEC server, or another suitable source described herein. At the same time, shader components 10 and 11 could represent customized shaders from a user-defined shader component library supplied by a user in any of the ways described herein.

Various benefits may arise when shaders are constructed automatically from a set of selected shader components such as illustrated by workflow 200 and FIG. 3. As one exemplary benefit, shaders may be constructed and allocated resources only on an as-needed basis, allowing for the avoidance of inefficiency that would otherwise result from allocating resources to each possible combination of shader functions. Because only shaders that are specifically requested are constructed (e.g., ahead of time, at runtime as graphics rendering is being performed, etc.), significant efficiency is achieved while providing ultimate flexibility as to what shader functionality can be requested and utilized. This request-based architecture may be particularly efficient and beneficial when new shader functionality (e.g., the fog effect and/or color correction of shader components 10 and 11 described above) are to be added such as for a new version of an application. In this example, the new shader components 10 and 11 only need to be developed once and then these may be available for use in any future shader construction requests when the fog effect and/or color correction is desired for a particular rendering situation.

Another exemplary advantage of constructing shaders from selected shader components as shown in workflow 200 is that various shader components may be flexibly customized to perform their respective functions in different ways and/or according to different parameters that may also be conveniently specified in shader constructions requests. Taking the fog effect shader function as one example, a fog effect shader component may be configured to function in various ways and/or in accordance with various parameters. For example, the fog effect shader component may be configured to support variations with different fog types (e.g., exponential fog, linear fog, no fog, etc.) and/or different characteristics (e.g., fog height, fog thickness, etc.). Each of these variations may be accessible by way of the shader construction request by passing in parameters or other indicators as part of the request. In this way, many different types of fog may be supported for many different existing shaders (e.g., shaders for skeletal meshes, sky, terrain, water, etc.) and the combinatorial explosion of needing to add every possible fog combinations to all of these different types of existing shaders is avoided since only combinations that are actually requested need to be constructed.

Another exemplary benefit of constructing shaders from selected shader components as shown in workflow 200 is that a desired platform may be indicated for which a requested shader is to be constructed. In certain implementations, shader components are shader language agnostic such that assembled shaders can be generated and optimized for specific platforms and have the ability to provide different generation paths for different platforms. The platforms indicated by such a platform indicator may be any of a plurality of platforms supported by the shader construction system (e.g., by system 100) in a particular implementation. For instance, in some implementations, the platform indicator may indicate a particular graphics API with which the shader is to be compatible, such as an OpenGL API, an OpenGL ES ("GLES") API, an OpenGL SC API, an OpenCL API, an OpenVG API, an OpenXR API, a WebGL API, a glTF API, or any other suitable graphics API or other API as may serve a particular implementation. In the same or other examples, a platform indicated by a platform indicator may refer to a particular development environment, a particular operating system, or to some other aspect of the platform with which the constructed shader is to be configured for use.

As yet another exemplary benefit of constructing shaders from selected shader components as shown in workflow 200, system 100 may be configured to optimize shader components in accordance with requested platforms as shaders are constructed. For example, as part of assembling a particular shader, system 100 may optimize the instructions associated with the set of selected shader components for the selected platform (i.e., the shader components indicated in the shader construction request) in any suitable manner. As one example, such optimizing of the shader component instructions may include removing, from the optimized instructions, particular instructions that relate to a platform other than the selected platform and that do not relate to the selected platform, and then compiling the optimized instructions for the selected platform.

In certain examples, variables within shader code may be exposed using macros or the like to turn specific functionality on and off within the shader. Rather than using such macros, shader optimization may be used to strip out unneeded code (i.e., code that is not to be used for the selected platform, parameters, variations of shader functionality, etc.) to thereby remove or mitigate any performance impact that might otherwise arise from these unused features. This optimization may be particularly beneficial for mobile platforms, as, in certain examples, thousands of lines of shader code may be able to be reduced down to a small number of instructions. In certain examples, it may also be possible to make parameterizable integer variables that are compiled directly into the shader such that loops can be unrolled and conditional statements can be optimized out. All of these types of optimizations are made possible when shader components are explicitly defined with unique shader signatures that will be described in more detail below.

Figure 4:
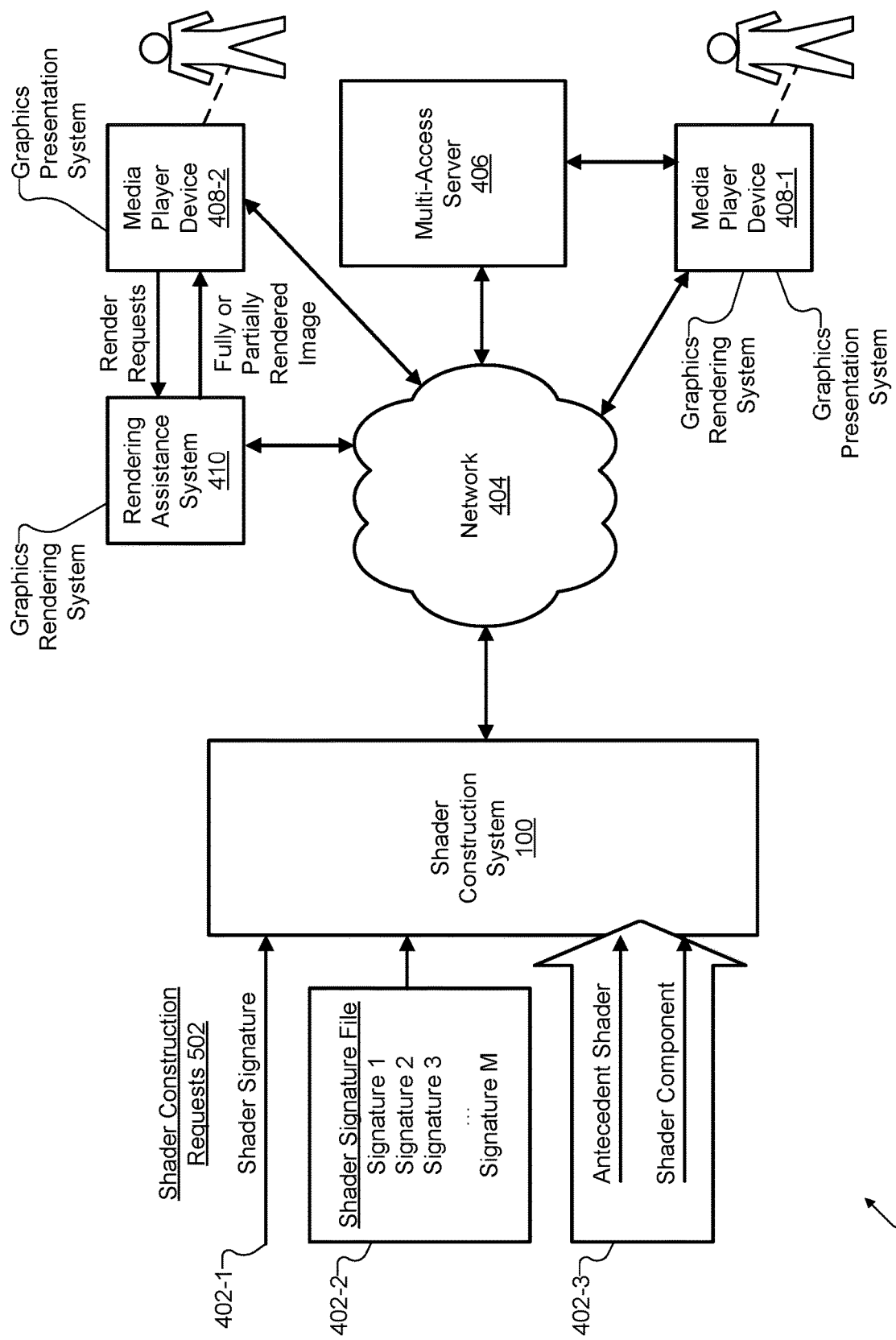
FIG. 4 illustrates an exemplary configuration in which a shader construction system operates to automatically construct shaders from respective sets of selected shader components according to embodiments described herein.

FIG. 4 illustrates an exemplary configuration 400 in which system 100 operates to automatically construct shaders from respective sets of selected shader components according to embodiments described herein. As shown in FIG. 4, various types of shader construction requests 402 (e.g., shader construction requests 402-1 through 402-3) may be received by system 100, each of which may direct system 100 to construct one or more respective shaders from respective sets of selected shader components indicated by the shader construction requests 402. To this end, system 100 is communicatively coupled, by way of a network 404, with a multi-access server 406, with one or more media player devices 408 (e.g., media player devices 408-1 and 408-2, as well as additional media player devices not explicitly shown in FIG. 4), with a rendering assistance system 410, and/or with any other systems or devices as may serve a particular implementation. Each of these components of configuration 400 will now be described in more detail.

Each shader construction request 402 may take any of various suitable forms and may be received by system 100 at any of various times or under various circumstances. To illustrate a few specific examples of the variation and flexibility that shader construction requests 402 may have, three different types of shader construction requests will now be described. It will be understood that other types of shader construction requests may also be used in certain implementations, including shader construction requests that combine aspects from two or more of the examples explicitly described herein.

Shader construction request 402-1 illustrates a first exemplary shader construction request. In this example, shader construction request 402-1 is shown to be implemented as a shader signature that is transmitted to and received by system 100. Such a shader signature may be provided during a runtime period in which a graphics rendering system (e.g., one of media player devices 408, rendering assistance system 410, etc., as will be described in more detail below) is to render an image using an assembled shader that results from the request. For example, shader construction request 402-1 may represent a real-time request for a particular shader to be immediately constructed for use as image rendering is ongoing.

Shader construction request 402-1 is configured to indicate a set of selected shader components by providing a particular shader signature. As such, the shader signature itself may define the shader that is to be assembled and may represent the set of selected shader components that is to be used in the shader's construction. In some examples, the shader signature may serve or be treated as a very compressed version of the shader itself, since the shader signature has all the data necessary for the shader to be constructed and provided, but uses much less data than the source code or compiled shader that it represents. As such, a shader signature may be converted into a fully constructed shader and, by the same token, a constructed shader may be converted into a shader signature that can be used in the same way. The assembling of the shader may therefore be performed during the runtime period, using the supplied shader signature, and in response to the shader construction request. Additionally, as will be described in more detail below, in some examples, a real-time, just-in-time assembly of the shader may be performed with assistance from multi-access server 406. This may be advantageous for various reasons including that every time a particular shader is requested from the server, the shader may be generated from the most up-to-date source code (e.g., source code that has been updated with bug fixes, new features, etc.).

Shader signatures such as the shader signature of shader construction request 402-1 may be take any form as may serve a particular implementation. For example, in certain implementations, a shader signature may be implemented as a textual string that includes a plurality of textual shader component identifiers that are separated by a first type of delimiter character. Each of these textual shader component identifiers may include a first text token representative of a shader component type and a second text token representative of a shader component parameter, and the first and second text tokens may be separated by a second type of delimiter character.

Figure 5:
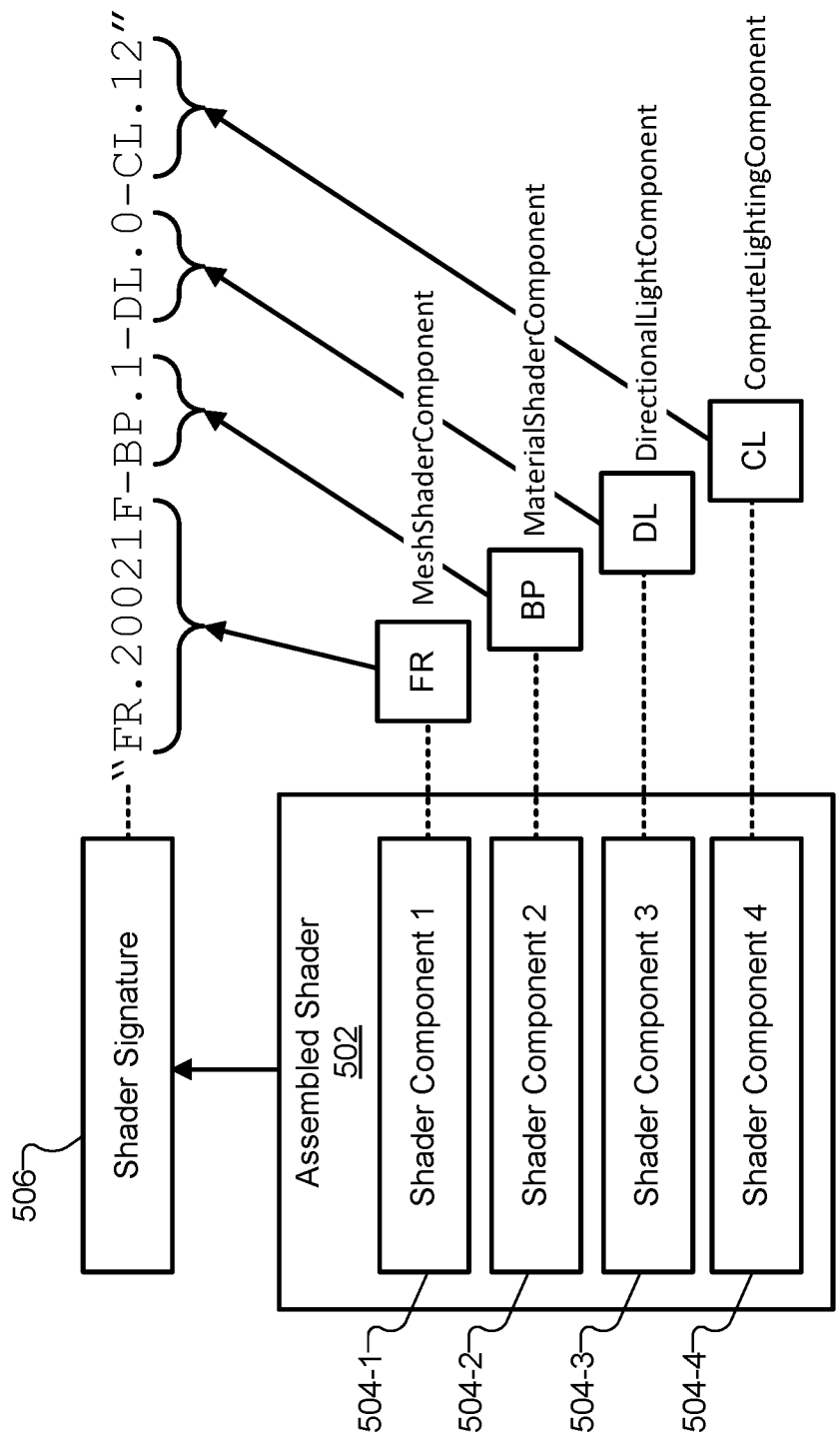
FIG. 5 illustrates an exemplary shader constructed using methods and systems described herein together with a shader signature for the shader according to embodiments described herein.

To illustrate, FIG. 5 shows an exemplary assembled shader 502 that has been constructed from a set of selected shader components 504 (i.e., shader components 504-1 through 504-4) in accordance with methods and systems described herein. Shader components 504 are labeled as "Shader Component X," where 'X' is an integer 1-4 to distinguish the four different shader components of this particular example. FIG. 5 further shows a shader signature

506 associated with assembled shader 502. For example, shader signature 506 will be understood to be a shader signature that, when included as part of a shader construction request such as shader construction request 402-1, would result in the construction of assembled shader 502.

Dotted lines extending to the right from each shader component 504 and from shader signature 506 lead to additional detail about each of these elements. Specifically, the dotted lines extending from each shader component 504 leads to respective text tokens (e.g., respective two-letter abbreviations in this example) representative of respective shader component types represented by each shader component 504. As shown, for example, "FR" is used as a text token for shader component 504-1, "BP" is used as a text token for shader component 504-2, "DL" is used as a text token for shader component 504-3, and "CL" is used as a text token for shader component 504-4. It will be understood that other types of text tokens (e.g., textual strings with fewer or more than the two characters shown in these examples, etc.) may be used in other examples.

Next to each text token representing a shader component type in FIG. 5, a name of the shader component type is printed. Each of these shader component types may be selected from a library of available shader components such as the default shader component library described above, a user-defined shader component library configured to be used instead of or in addition to a default library, or from any other library of shader components as may be available to system 100. As shown for this example, shader component 504-1 is of a "MeshShaderComponent" type, shader component 504-2 is of a "MaterialShaderComponent" type, shader component 504-3 is of a "DirectionalLightComponent" type, and shader component 504-4 is of a "ComputeLightingComponent" type.

The dotted line extending from shader signature 506 indicates a textual string that includes a plurality of textual shader component identifiers that are each framed by a bracket underneath them and that are separated in the textual string by a first type of delimiter character (e.g., a hyphen ('-') in this example). As shown, each textual shader component identifier in the plurality of textual shader component identifiers includes a first text token representative of a shader component type (i.e., "FR," "BP," "DL," or "CL") as well as a second text token (i.e., "20221F," "1," "0," or "12," respectively) that is representative of one or more shader component parameters. The first and second text tokens are shown to be separated by a second type of delimiter character (e.g., a period ('.') in this example) in each textual shader component identifier.

While the first text token of each textual shader component identifier is configured to define a particular type of shader component, as described above, the second text token may be configured to indicate one or more parameters that define a particular variation of the shader component type. To this end, the second text token is shown to be implemented by a hexadecimal number that is configured to encode all of the compile-time shader properties of a particular shader component into a single compact identifier, hash, or compressed signature, thereby allowing system 100 to recreate all the desired properties at runtime (it is noted that properties that vary at runtime may not be indicated by the shader signature, which may only be dependent on the specific compiled variation of the shader). While the compile-time properties are shown to be encoded into various bits of respective hexadecimal numbers in the example of FIG. 5, it will be understood that other types of text tokens (e.g., decimal numbers, binary numbers, octal numbers, encoded character strings, etc.) may be used in other examples.

The parameters represented by the second text tokens may define any suitable properties or aspects of how the corresponding shader component is to be instantiated, optimized, or otherwise deployed in the resultant shader, and may be encoded into and decoded from the text tokens (e.g., the hexadecimal strings) in any suitable manner. For example, a text token may be processed through a look-up-table to determine which components are encoded into the text token. Four hexadecimal characters may represent a 16-bit field, for example, which may be divided up into an arbitrary number of subfields associated with different parameters needing different numbers of bits to encompass the possible options that could be selected for the parameters. As one arbitrary example, for instance, a 16-bit field encoded into four hexadecimal characters could be configured to include one 3-bit subfield associated with a parameter having up to eight options, three 4-bit subfields associated with three parameters having up to sixteen options each, and one 1-bit subfield associated with a parameter having only two options. Each subfield encoded into a field of a text token may represent any suitable parameter. For instance, referring again to the fog effect example described above, several bits of a text token could be used to encode various options for a fog type (e.g., linear, exponential, no fog, etc.), while several other bits of the text token could be used to encode various options for other fog characteristics (e.g., fog height, fog thickness, etc.).

Returning to FIG. 4, shader construction request 402-2 illustrates another exemplary shader construction request. In this example, shader construction request 402-2 is shown to be implemented as a shader signature file that is transmitted to and received by system 100. Such a shader signature file may be provided prior to a runtime period during which the graphics rendering system is to render an image using an assembled shader that results from the request. As such, shader construction request 402-2 may, in this example, not be implemented as a real-time request like shader construction request 402-1, although it will be understood that each of these types of shader construction requests may be implemented as either real-time or non-real-time requests in other examples.

Shader construction request 402 indicates several respective sets (e.g., M sets in this example, where M is any integer greater than 1) of selected shader components by directing system 100 to process the shader signature file that includes a set of shader signatures each labeled as "Signature X" (where X is a number between 1 and M). Each of the shader signatures represented in the shader signature file of shader construction request 402-2 may be a distinct implementation of any of the types of shader signatures described above in relation to shader signature 506. As such, each of the shader signatures may correspond to a different shader that is to be constructed and employed by the graphics rendering system during the runtime period. In response to receiving shader construction request 402-2 and prior to the runtime period, system 100 may perform the assembling of various shaders as part of processing the shader signature file.

The shader signature file of shader construction request 402-2 may be generated in any suitable way. For instance, in certain examples, the shader signature file may be developed using a programming language such as a markup language or the like (e.g., JavaScript Object Notation ("JSON"), eXtended Markup Language ("XML"), etc.).

Shader construction request 402-3 illustrates yet another exemplary shader construction request. In this example, shader construction request 402-3 is shown to include both an antecedent shader and a new shader component that is to be added to the antecedent shader. For example, referring back to the example of FIG. 3, shader 302-1 with shader components 1, 2, and 3 could be an example of an antecedent shader, while one or both of shader components 10 and 11 (e.g., the fog effect and color correction shader components described in that example) could be an example of the shader component that is to be added onto the antecedent shader (e.g., to form any of shaders 302-1-A through 302-1-C). A request such as shader construction request 402-3 may be provided at any time prior to or during the runtime period. As shown in FIG. 4, shader construction request 402-3 may indicate a set of selected shader components by, first, indicating the antecedent shader that implements a first shader component (e.g., shader component 1) and does not implement a second shader component (e.g., shader component 10), and, second, identifying the second shader component as a shader component that is to be added to the antecedent shader.

Upon receiving shader construction request 402-3, system 100 may perform the assembling of a new shader by reassembling the antecedent shader so as to continue implementing the first shader component and to add an implementation of the second shader component. For example, system 100 may include each of the shader components of the antecedent shader (e.g., shader components 1, 2, and 3 in the example of antecedent shader 302-1) as well as either or both of the new shader components (e.g., shader components 10 and/or 11 in the example of antecedent shader 302-1) in a newly constructed (i.e., reassembled) shader that satisfies shader construction request 402-3.

Network 404 may be implemented by or include any type of communications network as may serve a particular implementation. For instance, in some examples, network 404 may be implemented by or include a provider-specific wired or wireless communications network (e.g., a cellular network used for mobile phone and data communications, a 4G or 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). The provider of such a provider network may own or control all of the elements necessary to sell and deliver communications services to users, including radio spectrum allocation, wireless network infrastructure, back haul infrastructure, customer care, provisioning of devices, network repair for the provider network, and so forth.

In the same or other examples, other networks external to the provider network may be included within network 404. For example, network 404 may include various interconnected networks that are outside of any provider network and outside the control of any provider of such a provider network. For example, the Internet, a wide area network, a content delivery network, and/or any other suitable network or networks may also be included within network 404. Any of these provider or non-provider networks included within or implementing network 404 may provide data delivery between server-side provider systems (e.g., system 100) and client-side systems and devices (e.g., media player devices 408), and may implement or employ any suitable communication technologies, devices, media, protocols, or the like as may serve that end in a particular implementation.

As mentioned above, in some examples, system 100 may be configured to construct or direct construction of a requested shader in real time or otherwise during runtime as graphics are being rendered and presented to a user. While certain implementations of system 100 may incorporate sufficient resources to construct requested shaders in real-time without assistance, other implementations of system 100 may be configured to communicate, by way of a network such as network 404, with a multi-access server (e.g., multi-access server 406) that may incorporate its own powerful computing resources and may otherwise be configured to assist in the real-time automated construction and assembly of a requested shader.

Accordingly, multi-access server 406 may represent one or more computing systems (e.g., server computers), devices, nodes, or other collections of computing resources. In some examples, multi-access server may be implemented as a MEC server that is integrated within a provider network implemented by network 404 and is configured for use by multiple users of the provider network. For example, such a MEC server may be integrated within one or more radio access network ("RAN") resources, core network resources, service access point ("SAP") resources, or other suitable resources of the provider network implemented by network 404. In some examples, a MEC server implementing or included within multi-access server 406 may be integrated within a provider network such as by being deployed on the provider network as an edge node on the network so as to communicate with devices and systems connected to the provider network with low latency. For example, if the provider network includes or is implemented by 4G network technology, a MEC server implementing multi-access server 406 may include or be implemented as a 4G or 5G node in a fixed 4G or 5G deployment, a mobile 4G or 5G deployment (e.g., a network on wheels), or another suitable deployment.

In other examples, multi-access server 406 may include or be implemented by a cloud server or other non-MEC server that may not be integrated within a provider network and, as such, may be associated with more latency when communicating with client systems such as media player devices 408. Such a cloud server may be communicatively coupled to media player devices 408 and/or system 100 by way of non-provider portions of network 404 (e.g., the Internet) as well by a provider network incorporated within network 404.

As shown in FIG. 4, multi-access server 406 may be separate from client systems served by multi-access server 406 such as media player devices 408. Additionally, because a multi-access server includes shared resources that can be leveraged by multiple client systems (e.g., multiple media player devices, etc.), it may be efficient and economical for multi-access server 406 to employ a considerable wealth of computing power (e.g., significantly more computing power and resources than may be practical to include within media player devices 408). For instance, multi-access server 406 may include a plurality of parallel processors (e.g., CPUs, GPUs, etc.) for efficiently and quickly constructing shaders based on shader construction requests as described herein, as well as for performing various advanced and processing-intensive rendering operations that may be requested by media player devices 408.

Media player devices 408 may each be implemented as (or may be included within) any suitable computing system or device as may be employed for performing any of the use cases or applications described herein. To this end, media player devices 408 may be equipped with (e.g., may include or have control of) one or more display screens such as traditional display screens, partially transparent heads-up display ("HUD") screens, computer monitors, or the like, that are configured to display rendered graphics presented by media player devices 408. Each media player device 408 may be implemented as a mobile device (e.g., a smartphone, a tablet computing device, etc.), a virtual or augmented reality device (e.g., a head-mounted device configured to display graphics directly in front of each eye of the user), a portable or stationary computing device (e.g., a personal desktop or laptop computer, etc.), a television device, or any other system or device as may serve a particular implementation.

Each respective user depicted as corresponding to one of media player devices 408 may represent any person who views graphics presented by the media player device 408. Typically, these users will have some degree of control over what graphics their respective media player devices 408 present. For instance, in an extended reality or video game application example, the users may indicate a particular viewpoint within a scene from which the users wish to view the world by moving an avatar around within the scene, turning to look in different directions, and so forth.

In some examples, as illustrated by media player device 408-1, a media player device used by a user may serve as both a graphics rendering system and a graphics presentation system. As used herein, a graphics rendering system will be understood to refer to the computing system that employs shaders constructed (with or without assistance from multi-access server 406) by system 100 to render graphics to be presented to the user. A graphics presentation system will be understood to refer to the computing system that directs a display screen to present the rendered graphics for the user to view. Depending on the nature of the application (e.g., the complexity and realism of the graphics, the resources available to the media player device, etc.) there may be implementations, as shown by media player device 408-1, where the media player device itself may serve as both the graphics rendering system and the graphics presentation system.

In other implementations, however, the nature of the application may call for the media player device to receive assistance in rendering graphics. For example, as illustrated, a media player device such as media player device 408-2 may interoperate with a rendering assistance system such as rendering assistance system 410 that acts as the graphics rendering system, or that at least is configured to assist with graphics rendering such that rendering assistance system 410 and media player device 408-2 could together be considered to implement the graphics rendering system. In these examples, the graphics rendering system is shown to be implemented (or at least partially implemented) by rendering assistance system 410, which is configured to interoperate with a graphics presentation system (i.e., media player device 408-2 in this example) to render images. As shown, the graphics presentation system in this type of embodiment is separate from the rendering assistance system and configured to present images once the images have been rendered by the interoperation of the rendering assistance system and the graphics presentation system.

Accordingly, it will be understood that, in these types of examples, system 100 may receive a shader construction request from rendering assistance system 410 and, in response, system 100 may provide an assembled shader in accordance with the shader construction request to rendering assistance system 410. To illustrate, FIG. 4 shows that media player device 408-2 transfers render requests to rendering assistance system 410 and may receive back fully or partially rendered images. These fully or partially rendered images are generated using shaders that rendering assistance system 410 may request and receive from system 100 prior to or during runtime of the rendering services. Fully rendered images requested and provided by rendering assistance system 410 to media player device 408-2 may be ready for presentation to the user by media player device 408-2, while partially rendered images requested and provided by rendering assistance system 410 may refer to data that is to be further processed by way of one or more additional rendering passes by media player device 408-2 prior to being presented to the user.

In some examples, rendering assistance system 410 may be implemented by a MEC server such as described above to be implemented by certain implementations of multi-access server 406. Additional details about exemplary rendering assistance systems such as rendering assistance system 410 are also described in co-pending U.S. patent application Ser. No. 16/805,397, filed Feb. 28, 2020, and entitled "Methods and Systems for Request-Based Graphics Rendering at a Multi-Access Server," the content of which is hereby incorporated by reference in its entirety.

As mentioned above, each shader component that is developed for use by system 100, whether stored in a library of available shader components or developed for use as a special custom shader, may be associated with instructions that, when accessed by system 100, allow system 100 to assemble a shader based on the instructions. These instructions may include various parts and functions that may be used in different ways by system 100 during the construction of a particular shader. For example, the instructions associated with one particular shader component may include instructions for various shader segments (i.e., parts of the assembled shader code) such as header segments, definition segments (e.g., attributes, variables, materials, etc.), utility functions, main shader segments, and so forth. Additionally, certain instructions associated with a particular shader component may be associated with one platform and be incompatible with other platforms, such that, when constructing a shader for a particular platform, only certain instructions included in the shader component may be relevant while other instructions are to be discarded.

System 100 may be configured to access and use the instructions associated with a particular shader component in any suitable manner that accounts for this variety of instructions that may be associated with the particular shader component. For instance, in certain implementations, the instructions associated with each shader component may include metadata indicative of a shader segment for which the instructions are to be used within the assembled shader. As such, the assembling of the shader by system 100 may include arranging the instructions into different shader segments of the assembled shader in accordance with the metadata.

Figure 6:
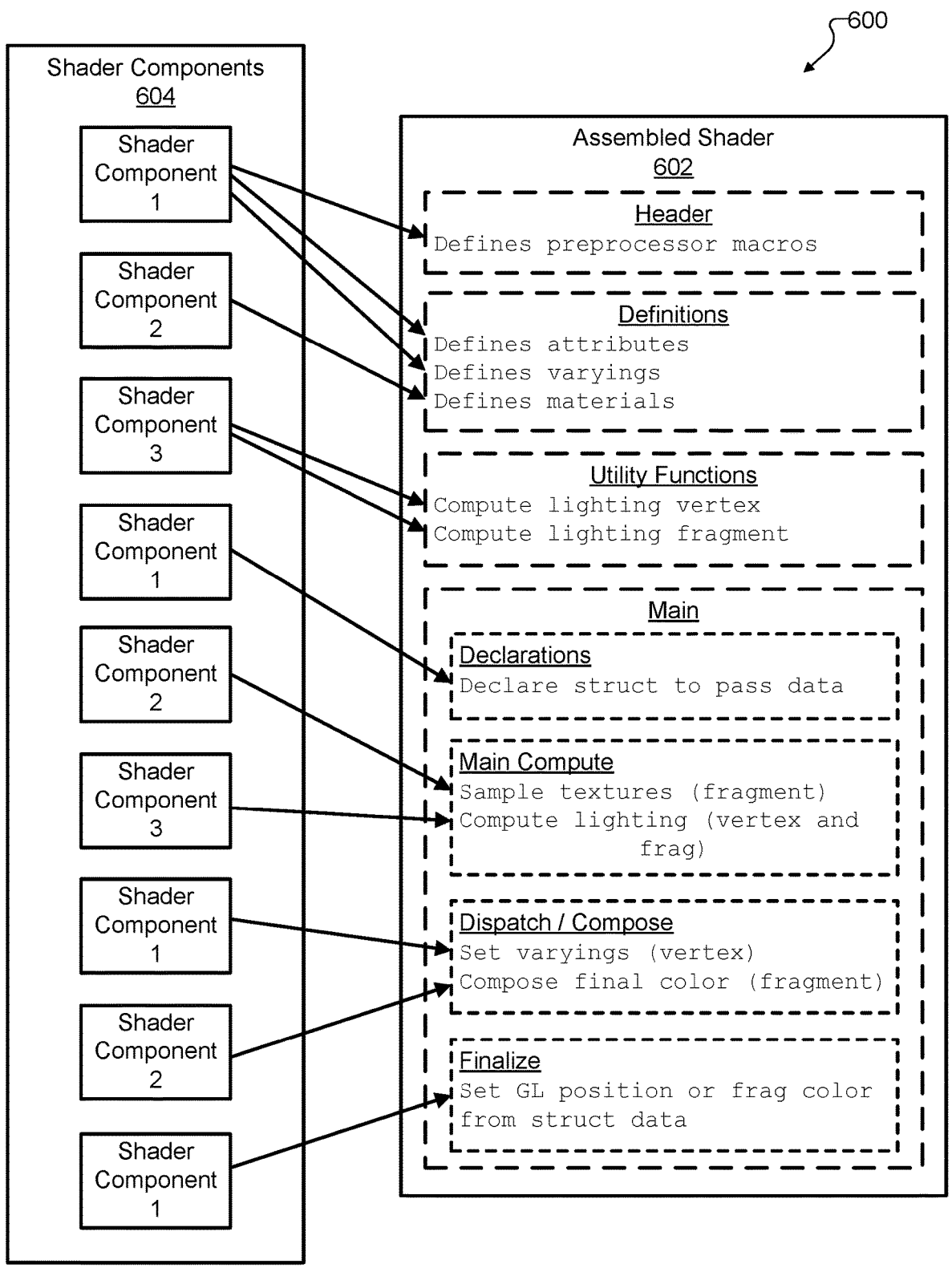
FIG. 6 illustrates an exemplary construction of a shader from a set of selected shader components according to embodiments described herein.

To illustrate, FIG. 6 shows an exemplary construction 600 of an assembled shader 602 from a set of selected shader components 604. As shown in FIG. 6, three different shader components labeled "Shader Component 1," "Shader Component 2," and "Shader Component 3" are included in shader components 604 for this example. However, different instructions associated with each of these shader components is used for different shader segments of assembled shader 602. For instance, as shown, instructions associated with "Shader Component 1" are used in a header segment (e.g., "Defines preprocessor macros"), in a definitions segment (e.g., "Defines attributes," and "Defines varyings"), in a declarations segment of a main shader segment (e.g., "Declare struct to pass data"), in a dispatch/compose segment of the main shader segment (e.g., "Set varyings (vertex)"), and in a finalize segment of the main segment ("Set GL position or frag color from struct data"). Instructions associated with "Shader Component 2" are shown to be used in the definitions segment (e.g., "Defines materials"), in a main compute segment of the main shader segment (e.g., "Sample textures (fragment)"), and in the dispatch/compose segment of the main shader segment (e.g., "Compose final color (fragment)"). Instructions associated with "Shader Component 3" are shown to be used in a utility functions segment (e.g., "Compute lighting vertex" and "Compute lighting fragment"), and in the main compute segment of the main shader segment (e.g., "Compute lighting (vertex and frag)").

System 100 may assemble shader 602 using instructions from each of shader components 604 based on metadata associated with shader components 604 that directs system 100 regarding which instructions to use for which shader segments. In this manner, system 100 uses instructions associated with all of shader components 604 to properly assemble shader 602, which, once fully assembled and constructed, may be suitable for use as a shader for any rendering operations for which it was requested. For example, assembled shader 602 may represent an implementation of any of shaders 302 or other suitable shaders described herein.

Figure 7:
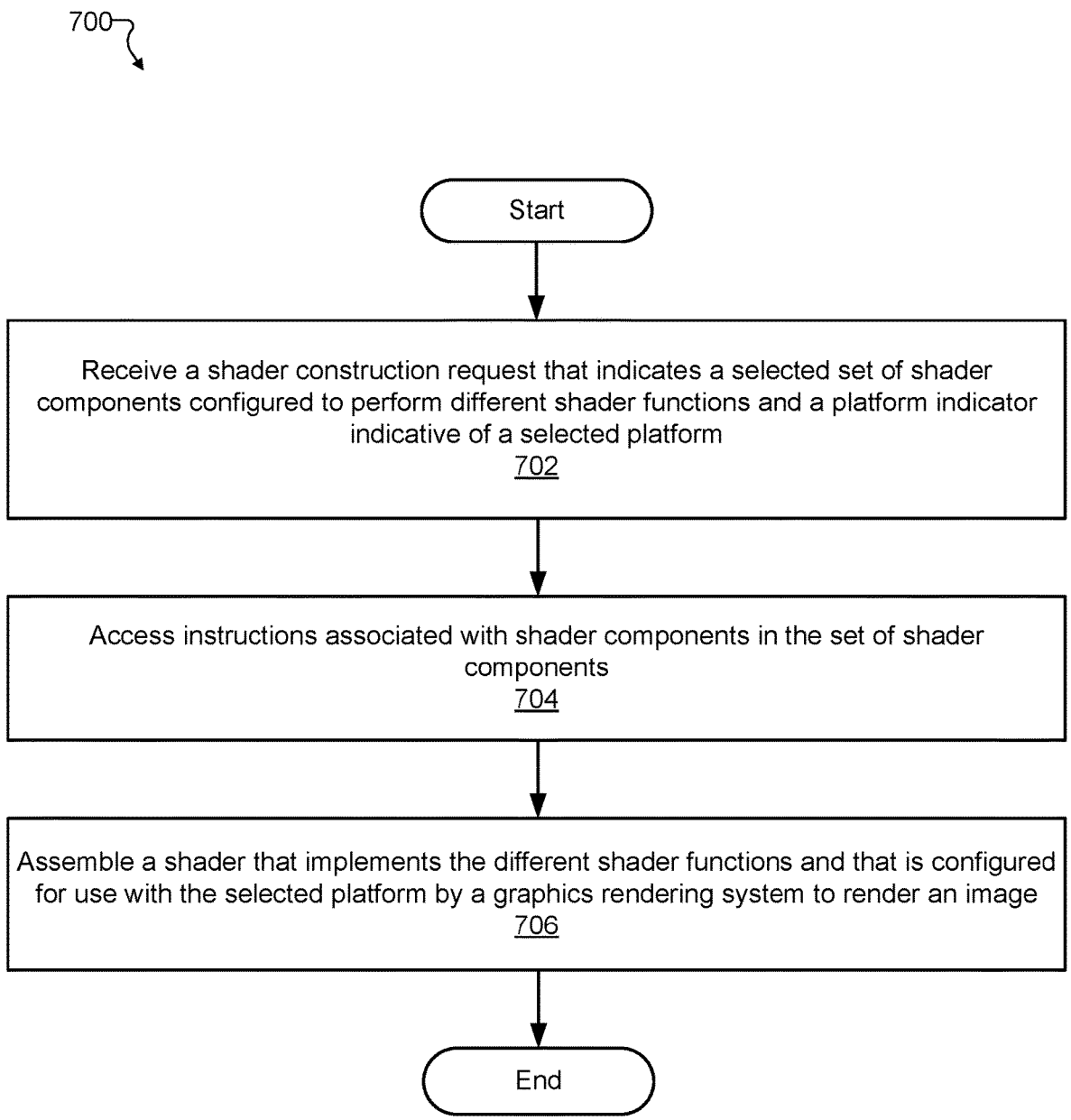
FIG. 7 illustrates an exemplary method for constructing a shader from a set of selected shader components according to embodiments described herein.

FIG. 7 illustrates an exemplary method 700 for constructing a shader from a set of selected shader components. While FIG. 7 illustrates exemplary operations according to one embodiment, other embodiments may omit, add to, reorder, and/or modify any of the operations shown in FIG. 7. One or more of the operations shown in FIG. 7 may be performed by a shader construction system such as system 100, any components included therein, and/or any implementation thereof.

In operation 702, a shader construction system may receive a shader construction request. In some examples, the shader construction request may indicate a set of selected shader components from a library of available shader components accessible to the shader construction system. For instance, the set of selected shader components may include a first shader component configured to perform a first shader function and a second shader component configured to perform a second shader function distinct from the first shader function. The shader construction request may further indicate a platform indicator in certain examples. For instance, the platform indicator may be indicative of a selected platform, from a plurality of platforms supported by the shader construction system, for which a shader is to be constructed. Operation 702 may be performed in any of the ways described herein.

In operation 704, the shader construction system may access instructions associated with the first and second shader components. For example, the shader construction system may access the instructions based on the shader construction request received at operation 702. Operation 704 may be performed in any of the ways described herein.

In operation 706, the shader construction system may assemble a shader that implements the first and second shader functions. For example, the shader construction system may assemble the shader based on the instructions that are associated with the first and second shader components and are accessed at operation 704. In some examples, the shader assembled at operation 706 may be configured for use by a graphics rendering system to render an image. For instance, the shader may be configured for use with the selected platform indicated by the platform indicator received in operation 702. Operation 706 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 8:
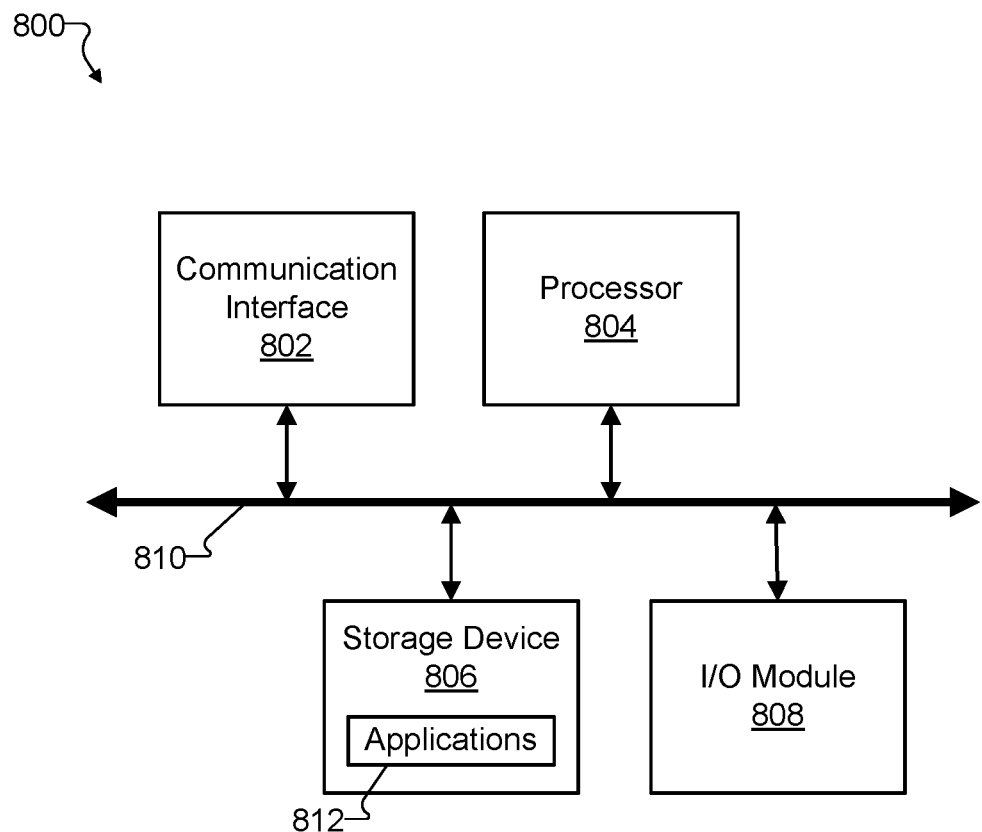
FIG. 8 illustrates an exemplary computing device according to principles described herein.

FIG. 8 illustrates an exemplary computing device 800 that may be specifically configured to perform one or more of the processes described herein. For example, computing device 800 may implement a shader construction system such as system 100, a device such as one of media player devices 408, a multi-access server such as multi-access server 406, a rendering assistance system such as rendering assistance system 410, or any other computing devices described herein.

As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 806. For example, data representative of one or more executable applications 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. One or more I/O modules may be used to receive input for a single virtual experience. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with processing facility 104 of system 100. Likewise, storage facility 102 of system 100 may be implemented by or within storage device 806.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    accessing, by a shader construction system and based on a shader signature included within a shader construction request, a first plurality of instructions associated with a first shader component and a second plurality of instructions associated with a second shader component, wherein:
        the shader signature includes a first text token that defines a first shader component type for the first shader component and a second text token that defines a second shader component type for the second shader component,
        the accessing of the first plurality of instructions is performed based on the first text token and the accessing of the second plurality of instructions is performed based on the second text token, and
        the first plurality of instructions includes a first instruction that relates to a selected platform indicated in the shader construction request and a second instruction that relates to a non-selected platform and that is incompatible with the selected platform;
    assembling, by the shader construction system and based on the first and second pluralities of instructions, a shader configured for use with the selected platform to perform shader functions implemented by the first and second shader components; and
    providing, by the shader construction system, the assembled shader to a graphics rendering system configured to use the assembled shader to perform the shader functions as part of rendering an image.

2. The method of claim 1, wherein:
    the selected platform is a particular graphics application programming interface (API) for which the shader is to be compatible; and
    the selected platform is indicated in the shader construction request by a platform indicator representative of the particular graphics API.

3. The method of claim 1, wherein:
    the selected platform is at least one of a particular operating system or a particular development environment for which the shader is to be compatible; and
    the selected platform is indicated in the shader construction request by a platform indicator representative of the particular operating system or the particular development environment.

4. The method of claim 1, wherein the assembling of the shader includes:

optimizing the first plurality of instructions for the selected platform by removing, from the first plurality of instructions, the second instruction that relates to the non-selected platform; and compiling the optimized first plurality of instructions for the selected platform.

5. The method of claim 1, wherein the first and second shader components are included in a set of selected shader components selected from a library of available shader components accessible to the shader construction system.

6. The method of claim 1, wherein:

the shader construction request directs, prior to a runtime period during which the graphics rendering system is to render the image using the assembled shader, the shader construction system to process a file that includes the shader signature corresponding to the assembled shader; and the assembling of the shader is performed as part of processing, by the shader construction system in response to the shader construction request and prior to the runtime period, the file that includes the shader signature corresponding to the assembled shader.

7. The method of claim 1, wherein:

the shader signature is implemented as a textual string that includes a plurality of textual shader component identifiers that are separated by a first type of delimiter character; and each textual shader component identifier in the plurality of textual shader component identifiers includes, separated by a second type of delimiter character, a text token representative of a shader component type and a seeend text token representative of a shader component parameter.

8. The method of claim 1, wherein:

the shader construction request provides the shader signature during a runtime period in which the graphics rendering system renders the image using the assembled shader; and the assembling of the shader is performed using the shader signature during the runtime period and in response to the shader construction request.

9. The method of claim 1, wherein:

the shader construction request indicates an antecedent shader that implements the first and second shader components and does not implement an additional shader component available in a library of shader components accessible to the shader construction system;

the method further comprises accessing an additional plurality of instructions associated with the additional shader component; and the assembling of the shader is performed by reassembling the antecedent shader so as to continue performing the shader functions implemented by first and second shader components and to further perform, based on the additional plurality of instructions, an additional shader function implemented by of the additional shader component.

10. The method of claim 1, wherein:

the first instruction includes metadata indicative of a shader segment for which the first instruction is to be used within the assembled shader; and the assembling of the shader is performed based on the metadata by arranging the first instruction to be included in the shader segment indicated by the metadata.

11. The method of claim 1, wherein at least one of the first or second shader components comprises a user-defined shader component selected from a user-defined shader component library that is developed independently of additional shader components included in a default library of available shader components.

12. A system comprising:

a memory storing a first plurality of instructions associated with a first shader component and a second plurality of instructions associated with a second shader component; and a processor communicatively coupled to the memory and configured to:

access, based on a shader signature included within a shader construction request and indicating a selected platform, the first plurality of instructions and the second plurality of instructions, wherein:

the shader signature includes a first text token that defines a first shader component type for the first shader component and a second text token that defines a second shader component type for the second shader component, the accessing of the first plurality of instructions is performed based on the first text token and the accessing of the second plurality of instructions is performed based on the second text token, and the first plurality of instructions includes a first instruction that relates to the selected platform and a second instruction that relates to a non-selected platform and that is incompatible with the selected platform;

assemble, based on the first and second pluralities of instructions, a shader configured for use with the selected platform to perform shader functions implemented by the first and second shader components; and provide the assembled shader to a graphics rendering system configured to use the assembled shader to perform the shader functions as part of rendering an image.

13. The system of claim 12, wherein:

the selected platform is at least one of a particular graphics application programming interface (API), a particular operating system, or a particular development environment for which the shader is to be compatible; and the selected platform is indicated in the shader construction request by a platform indicator representative of the particular graphics API, the particular operating system, or the particular development environment.

14. The system of claim 12, wherein the assembling of the shader includes:

optimizing the plurality of instructions for the selected platform by removing, from the first plurality of instructions, the second instruction that relates to the non-selected platform; and compiling the optimized first plurality of instructions for the selected platform.

15. The system of claim 12, wherein the first and second shader components are included in a set of selected shader components selected from a library of available shader components accessible to the system.

16. The system of claim 12, wherein:

the shader construction request directs, prior to a runtime period during which the graphics rendering system is to render the image using the assembled shader, the system to process a file that includes the shader signature corresponding to the assembled shader; and the assembling of the shader is performed as part of processing, in response to the shader construction request and prior to the runtime period, the file that includes the shader signature corresponding to the assembled shader.

17. The system of claim 12, wherein:

the shader construction request provides the shader signature, during a runtime period in which the graphics rendering system renders the image using the assembled shader; and the assembling of the shader is performed using the shader signature during the runtime period and in response to the shader construction request.

18. The system of claim 12, wherein:

the shader construction request indicates an antecedent shader that implements the first and second shader components and does not implement an additional shader component available in a library of shader components accessible to the system;

the processor is further configured to access an additional plurality of instructions associated with the additional shader component; and the assembling of the shader is performed by reassembling the antecedent shader so as to continue performing the shader functions implemented by first and second shader components and to further perform, based on the additional plurality of instructions, an additional shader function implemented by the additional shader component.

19. The system of claim 12, wherein:

the first instruction includes metadata indicative of a shader segment for which the first instruction is to be used within the assembled shader; and the assembling of the shader is performed based on the metadata by arranging the first instruction to be included in the shader segment indicated by the metadata.

20. A non-transitory computer-readable medium storing a first plurality of instructions associated with a first shader component, a second plurality of instructions associated with a second shader component, and program instructions that, when executed, direct a processor of a computing device to:

access, based on a shader signature included within a shader construction request and indicating a selected platform, the first plurality of instructions and the second plurality of instructions, wherein:

the shader signature includes a first text token that defines a first shader component type for the first shader component and a second text token that defines a second shader component type for the second shader component, the accessing of the first plurality of instructions is performed based on the first text token and the accessing of the second plurality of instructions is performed based on the second text token, and the first plurality of instructions includes a first instruction that relates to the selected platform and a second instruction that relates to a non-selected platform and that is incompatible with the selected platform;

assemble, based on the first and second pluralities of instructions, a shader configured for use with the selected platform to perform shader functions implemented by the first and second shader components; and provide the assembled shader to a graphics rendering system configured to use the assembled shader to perform the shader functions as part of rendering an image.

* * * * *